United States Patent Office 3,240,779
Patented Mar. 15, 1966

3,240,779
PHENTHIAZINE DERIVATIVES
Robert Michel Jacob, Ablon-sur-Seine, and Jacques Georges Robert, Gentilly, France, assignors to Rhone Poulenc S.A.
No Drawing. Filed Apr. 13, 1959, Ser. No. 805,694
Claims priority, application France, Apr. 22, 1958, 763,790, Patent 1,261,878
6 Claims. (Cl. 260—243)

This invention relates to new derivatives of phenthiazine, to processes for their preparation, and pharmaceutical compositions containing them.

During especially the past decade, considerable research and experimentation have been conducted in the field of N-substituted phenthiazine derivatives and certain of these compounds have been found to possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion-sickness. It has nevertheless been demonstrated that of the very large number of possible N-substituted phenthiazine compounds that have been proposed or tested by various workers, only comparatively few types have useful application in human or veterinary medicine and that both the nature and the degree of useful effect can radically alter even with apparently small changes in chemical structure.

It is an object of the present invention to provide new phenthiazine derivatives which possess unexpectedly useful pharmacological properties of a nature hereinafter referred to in detail and of a degree of activity that could not have been predicted from knowledge of their chemical structure.

The phenthiazine derivatives of the present invention are those which conform to the general formula:

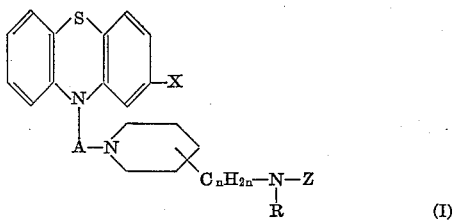
(I)

and their acid addition and quaternary ammonium salts, wherein X represents a hydrogen or halogen atom or a lower alkyl, alkoxy or acyl group or a cyano, methylthio, methane-sulphonyl, dimethylsulphamoyl or trifluoromethyl group, A represents a divalent straight or branched aliphatic hydrocarbon group containing 2 to 4 carbon atoms with at least two carbon atoms between the nitrogen atom of the phenthiazine nucleus and that of the piperidine nucleus, $n$ represents 0 or 1, R represents a hydrogen atom or a methyl group and Z represents a lower acyl, alkoxycarbonyl or alkanesulphonyl group, or a carbamoyl or sulphamoyl group which may be substituted on the nitrogen atom to form, for example, a group conforming to the formula

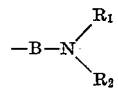

wherein B represents a CO or $SO_2$ group, and $R_1$ represents a hydrogen atom or a lower alkyl group and $R_2$ represents a lower alkyl group or $R_1$ and $R_2$ together with the nitrogen atom to which they are attached form a pyrrolidino, piperidino or morpholino group. The word "lower" as herein applied to alkyl, alkoxy, acyl and alkane groups means that the group in question contains not more than four carbon atoms. When X is a halogen atom, it may be chlorine, bromine, fluorine or iodine, but is preferably chlorine. The hydrocarbon group A may be, for example, any of the following groups:

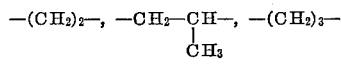

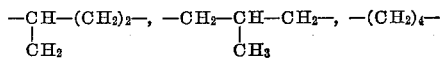

The substituent

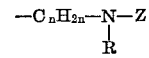

may be in the 2-, 3-, or 4-position of the piperidine nucleus. These new phenthiazine compounds may be prepared by the application of known methods for the conversion of phenthiazine in its C-substituted products into the corresponding 10-aminoalkyl-phenthiazines. Such methods when so applied can be defined generically as comprising the interaction of a phenthiazine derivative of the formula:

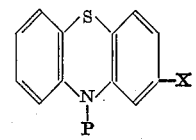
(II)

(wherein X is as hereinbefore defined) with a compound Q, the group P and the compound Q being such that they will interact to produce or form in the 10-position of the phenthiazine nucleus a group of the formula:

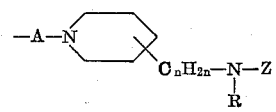
(III)

(wherein A, $n$, R and Z are as hereinbefore defined).

According to a feature of the present invention, the phenthiazine derivatives of general Formula I are prepared by a process which comprises reacting a phenthiazine if the general formula:

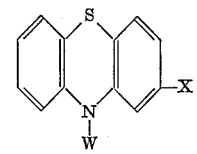
(IV)

with a piperidine derivative of the general formula:

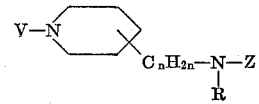
(V)

wherein one of the groups W and V represents a hydrogen atom and the other a group —A—Y, Y representing an acid residue such as a halogen atom, for example chlorine or bromine, a sulphate group, for example methylsulfate, or a sulphonate group, for example, toluene-p-sulphonate or methanesulphonate, and the other symbols are as hereinbefore defined. Preferably, the symbol Y is a chlorine or bromine atom. Where X is an acyl group, it may be advantageous to protect this group during the reaction, for example, by forming an anil or ketal.

The reaction may be effected with or without a solvent in the presence or absence of a condensing agent.

When W represents a hydrogen atom and V represents the group —A—Y, it is advantageous to use a solvent of the group of aromatic hydrocarbons (for example, toluene or xylene), ethers (for example, diethyl ether) or tertiary amides (for example, dimethylformamide) in the presence of a condensing agent preferably of the class of alkali metals and their derivatives (such as, for example, hydrides, amides, hydroxides, alcoholates, metal alkyl or aryls) and, more particularly, metallic sodium or potassium, sodamide, powdered sodium or potassium hydroxide, lithium or sodium hydride, sodium tert-butoxide, butyllithium, phenyllithium or phenylsodium. The reaction is preferably carried out at the boiling temperature of the solvent. It is particularly advantageous to use a piperidinoalkyl halide in the form of the free base in solution in, for example, benzene, toluene or xylene and to add it to the mixture of other reagents wherein the phenthiazine employed may already be present, in part at least, in the form of an alkali metal salt. The reaction may also be effected with a salt of the piperidinoalkyl halide but in this case a greater proportion of the condensing agent must be used in order to neutralise the acid of the salt employed.

In the case where the divalent aliphatic hydrocarbon group —A— is an asymmetric branched chain, such for example as

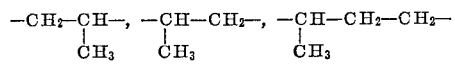

or

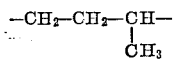

isomerisation can take place during the course of the reaction with the formation of a mixture of isomers. This isomerisation is analogous to that which takes place in the preparation of promethazine by the condensation of phenthiazine with a dimethylaminohalogenopropane, a process which, using either 2-dimethylamino-1-chloropropane or 1-dimethylamino-2-chloropropane as starting material, gives the same final mixture in which promethazine predominates. Separation of the isomers may be effected by, for example, fractional crystallisation of salts such as the hydrochlorides from a suitable solvent such as an alcohol.

When V represents a hydrogen atom and W represents the group —A—Y, it is advantageous to carry out the reaction in an aromatic hydrocarbon or an alcohol solvent medium and to use as condensing agent an excess of piperidine.

According to a further feature of the present invention, the new phenthiazine derivatives of Formula I are prepared by the process which comprises converting the grouping

in a phenthiazine derivative of the general formula:

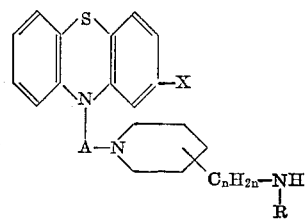

into the grouping

(wherein Z and the other symbols are as hereinbefore defined) by known methods for the introduction of an acyl, alkoxycarbonyl, alkanesulphonyl, carbamoyl or sulphamoyl group into a primary or secondary amino group. By the words "known methods" as used in this specification and the appended claims is meant methods heretofore employed or described in the chemical literature.

The conversion may be effected, for example, by reacting the phenthiazine derivative with a carboxylic acid anhydride, chloride or ester (products of Formula I are obtained in which X is an acyl group), an alkyl chlorocarbonate (products of Formula I are obtained in which Z is an alkoxycarbonyl group), an alkanesulphonyl halide (products of Formula I are obtained in which Z is an alkanesulphonyl group), a carbamoyl halide, alkali metal isocyanate or alkylisocyanate (products of Formula I are obtained in which Z is a carbamoyl group), or a sulphamoyl halide (products of Formula I are obtained in which Z is a sulphamoyl group).

According to another feature of the invention, the phenthiazine derivatives of Formula I are prepared by the process which comprises the decarboxylation of a phenthiazine-10-carboxylate of the general formula:

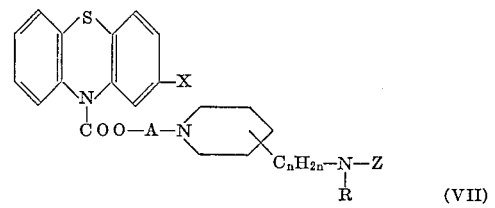

(wherein the various symbols are as hereinbefore defined) by heating to a temperature above 100° C., preferably between 150 and 220° C., until evolution of carbon dioxide ceases. There is no advantage in operating at temperatures higher than 220° C. since the reaction products are then generally more discoloured. The reaction can be effected with the phenthiazine-10-carboxylate alone, i.e., without a diluent, or in an inert organic solvent of high boiling point such as liquid paraffin, diphenyl oxide, quinoline, weak bases or o-dichlorobenzene.

During the course of the decomposition of the phenthiazine-10-carboxylate an isomerisation, similar to that described with respect to the first process, takes place when the divalent aliphatic group A is an asymmetric branched chain.

The phenthiazine-10-carboxylates of Formula VII may be obtained by known methods for the preparation of aminoalkyl phenthiazine-10-carboxylates, for example, by reaction of a halide (or an ester) of a phenthiazine-10-carboxylic acid upon a compound of the general formula:

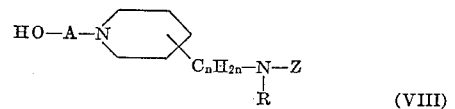

(wherein the various symbols are as hereinbefore defined), or by reaction of a halogenoalkyl phenthiazine-10-carboxylate on the appropriately substituted piperidine.

According to a still further feature of the invention, the phenthiazine derivatives of Formula I are prepared by the process which comprises reducing by means of molecular hydrogen in the presence of a hydrogenation catalyst a pyridinium salt of the formula:

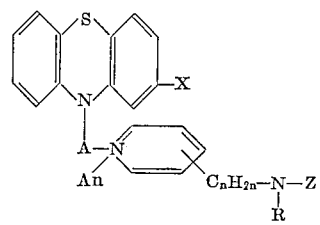

(wherein An represents an anion and the other symbols are as hereinbefore defined). Preferably a catalyst containing a noble metal such as platinum, in particular Adams' platinum, is employed. It is advantageous to effect the hydrogenation in an alcoholic or aqueous-alcoholic medium at atmospheric pressure and room temperature.

The new phenthiazine derivatives of Formula I may be converted in manner known per se into acid addition salts and quaternary ammonium derivatives. The acid addition salts may be obtained by the action of acids on the phenthiazine derivatives in appropriate solvents. As organic solvent there may be used, for example, alcohols, ethers, ketones or chlorinated hydrocarbons; water may advantageously be used as an inorganic solvent. The salt which is formed is precipitated, if necessary after concentration of its solution, and is separated by filtration or decantation.

The quaternary ammonium derivatives may be obtained by the action of esters on the phenthiazine derivatives, optionally in an organic solvent, at room temperature or, more rapidly, with gentle heating.

The new phenthiazine derivatives of Formula I may be purified by physical methods such as distillation, crystallisation or chromatography, or by chemical methods such as the formation of salts, crystallisation of the salts and decomposition of them in an alkaline medium. In the said chemical method the nature of the anion of the salt is immaterial, the only requirement being that the salt must be well-defined and readily crystallisable.

The new phenthiazine derivatives of the present invention possess valuable pharmacodynamic properties; in particular, they are extremely active depressors of the nervous system, excellent potentiators of narcosis, tranquillisers, powerful antiemetics and analgesics. Compounds of the present invention which possess outstanding utility in the aforesaid respects are those in which the hydrocarbon chain A is —$(CH_2)_3$— or

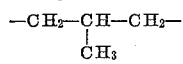

and the substituent on the piperidine nucleus

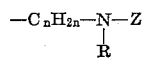

is in the 4-position. Individual compounds of importance are those which, either as such or in the form of acid addition salts, are specified in the examples which follow. Compounds of outstanding importance are those in which X is a chlorine atom, A is —$(CH_2)_3$—, the substituent

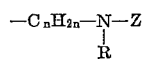

is in the 4-position of the piperidine nucleus, $n$ and R are as defined, and Z is —CO—$CH_3$ or —$SO_2$—$CH_3$, e.g., 3 - chloro - 10-(3-4' - acetamidopiperidinopropyl) phenthiazine, 3-chloro-10-(3-4' - acetamidomethylpiperidinopropyl)-phenthiazine, 3-chloro-10-(3-4'-methanesulphonamidopiperidinopropyl)phenthiazine, 3-chloro - 10- (3-4'- N-methylacetamidopiperidinopropyl)phenthiazine, 3-chloro-10-(3-4'-N-methyl - methanesulphonamidopiperidinopropyl)phenthiazine, 3-chloro-10-(3-4'-methanesulphonamidomethylpiperidinopropyl)phenthiazine and 3-chloro-10-(3-4' - N - methylacetamidomethylpiperidinopropyl)phenthiazine.

For therapeutic purposes, the bases of general Formula I are preferably employed as such or in the form of non-toxic acid addition salts, i.e., salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, oxalates, tartrates, methanesulphonates, ethanedisulphonates, chlorotheophyllinates, theophyllinates, salicylates, phenolpthaleinates, and methylene-bis-β-hydroxynaphthoates) so that the beneficial physiological properties inherent in the bases are not vitiated by side-effects ascribable to the anions. However, they may also be employed in the form of non-toxic quaternary ammonium salts obtained by reaction with organic halides (e.g. methyl, ethyl, allyl or benzyl iodide, chloride or bromide) or other reactive esters, e.g. methyl or ethyl sulphate or toluene-p-sulphonate.

The following examples illustrate the invention.

*Example I*

A solution of 3-chloro-10-(3-chloropropyl)phenthiazine (15.5 g.) and 4-acetamidopiperidine (7.8 g.) in anhydrous ethanol (100 cc.) with powdered anhydrous sodium carbonate (5.3 g.) is heated for 21 hours under reflux. Further sodium carbonate (2.7 g.) is added and heating under reflux is continued for 9 hours. The ethanol is removed under reduced pressure (about 30 mm. Hg). The residue is treated with water (150 cc.) and ethyl acetate (300 cc.) and is then agitated with 4 N sulphuric acid (60 cc.). The organic phase is separated and extracted again with 4 N sulphuric acid (15 cc.). The aqueous acid phases are combined and made alkaline with sodium hydroxide (60 cc., $d=1.33$) and the free base is extracted with ethyl acetate (500 cc. in two lots). The organic solution is dried over anhydrous potassium carbonate and concentrated to dryness under reduced pressure (about 30 mm. Hg).

The base thus isolated (17.9 g.) is a thick pale yellow oil which eventually crystallises. It is converted into a hydrochloride by dissolving in acetone and adding ethereal hydrogen chloride. There is thus obtained 3-chloro-10-(3-4' - acetamidopiperidinopropyl)phenthiazine hydrochloride (15.6 g.) as a white crystalline powder, M.P. 204–210° C.

By dissolving the isolated base in acetone as above and adding different acids, other salts may be obtained: the acid maleate employing maleic acid; the neutral tartrate employing tartaric acid; the 8-chlorotheophyllinate employing 8-chlorotheophylline and the methanesulphonate employing methanesulphonic acid.

4-acetamidopiperidine (M.P. 134–136° C.) is obtained by catalytic debenzylation in methanol with palladium on charcoal of 1-benzyl-4-acetamidopiperidine (M.P. 140–142° C.), itself prepared by acetylation of 1-benzyl-4-aminopiperidine. 1-benzyl-4-aminopiperidine is prepared from 1-benzyl-4-piperidone by the method of Brookes et al., J. Chem. Soc., 3165 (1957).

*Example II*

A solution of 3-chloro-10-(3-toluene-p-sulphonyloxypropyl)phenthiazine (22 g.) and 4-acetamidomethylpiperidine hydrochloride (9.5 g.) in anhydrous ethanol (150 cc.) with powdered anhydrous sodium carbonate (10.5 g.) is heated for 20 hours under reflux. The ethanol is removed under reduced pressure (about 30 mm. Hg) and the residue is treated with water (250 cc.) and ethyl acetate (100 cc.) and agitated with 4 N hydrochloric acid (40 cc.). The aqueous phase is separated and extracted again with ethyl acetate (50 cc.). The aqueous phase is made alkaline with sodium hydroxide (30 cc., $d=1.33$) and the free base is extracted with ethyl acetate (150 then 100 cc.). The organic solution is dried over anhydrous potassium carbonate and concentrated to dryness under reduced pressure (about 15 mm. Hg).

After recrystallisation of the residue from acetonitrile, there is obtained 3-chloro-10-(3-4'-acetamidomethylpiperidinopropyl)phenthiazine (13.9 g.) as a white crystalline powder, M.P. 106–107° C.

The 4-acetamidomethylpiperidine hydrochloride (M.P. 184° C.) is obtained by catalytic hydrogenation at ordinary pressure of 4-acetamidomethylpyridine hydrochloride (the base melts at 89–90° C.) in aqueous ethanol in the presence of Adams' platinum.

*Example III*

To a solution of 3-chloro-10-(3-4'-aminopiperidinopropyl)phenthiazine (7.5 g.) in N hydrochloric acid (44 cc.) there is added at 20° C. a solution of potassium cyanate (1.98 g.) in water (10 cc.) and the mixture is left for 16 hours.

The reaction liquors are made alkaline with sodium hydroxide (5 cc., d=1.33) and the free base is extracted with ethyl acetate (2 x 100 cc.). The organic solution is dried over anhydrous potassium carbonate and concentrated to dryness on a water-bath. The solid residue is ground in the presence of ethyl acetate (20 cc.), filtered, washed with the same solvent and dried in a desiccator under a pressure of about 15 mm. Hg.

There is thus obtained 3-chloro-10-(3 - 4'-carbamoyl-aminopiperidinopropyl) phenthiazine (7.1 g.) as a white crystalline powder, M.P. 120–124° C.

3-chloro-10-(3-4' - aminopiperidinopropyl)phenthiazine employed as starting material is a thick oil (used in crude form) obtained by deacetylation of 3-chloro-10-(3-4' - acetamidopiperidinopropyl)phenthiazine with 3 N hydrochloric acid for 5 hours under reflux.

*Example IV*

A solution of 3-chloro-10-(3-4'-aminopiperidinopropyl) phenthiazine (7.5 g.), methanesulphonyl chloride (2.3 g.) and pyridine (1.6 g.) in anhydrous toluene (75 cc.) is heated for 2 hours under reflux. The reaction liquors are diluted with ether (100 cc.) and agitated with a solution of methanesulphonic acid (4.5 cc.) in water (150 cc.). The aqueous acid phase is separated and made alkaline with sodium hydroxide (40 cc., d=1.33) and the free base is extracted with ethyl acetate. The organic solution is dried over anhydrous potassium carbonate and concentrated to dryness under a pressure of 20 mm. Hg.

The residue is redissolved in benzene (100 cc.) and the solution is filtered through a column of chromatographic alumina (100 g.). It is eluted successively with benzene, with benzene-ethyl acetate mixtures of increasing ester content and finally with pure ethyl acetate. After evaporation of the solvent, there is obtained pure 3-chloro-10-(3-4' - methanesulphonamidopiperidinopropyl)phenthiazine (5.9 g.) which, after recrystallisation from benzene-cyclohexane mixture (3:2), is obtained in the form of a creamy-white crystalline powder, M.P. 129–131° C.

*Example V*

A solution of 3-chloro-10-(3-chloropropyl)phenthiazine (27.8 g.) and 4-(N-methylacetamido)piperidine (15.1 g.) in anhydrous ethanol (270 cc.) with powdered sodium carbonate (9.6 g.) is heated under reflux for 24 hours. Further sodium carbonate (4.8 g.) is added and the mixture is then heated for a further 8 hours under reflux. After another addition of sodium carbonate (4.8 g.), the solution is finally heated for 15 hours under reflux.

The ethanol is removed under reduced pressure (about 30 mm. Hg) and the residue is treated with water (200 cc.) and extracted with ethyl acetate (2 x 400 cc.). The organic phase is extracted with 2.5 N hydrochloric acid (250 cc.). The aqueous acid phase is made alkaline with sodium hydroxide (80 cc., d=1.33) and the free base is extracted with ethyl acetate. The organic solution is dried over anhydrous potassium carbonate and concentrated to dryness under reduced pressure (about 30 mm. Hg).

The residue is redissolved in benzene (400 cc.) and the solution is filtered through a column of chromatographic alumina (350 g.) and eluted with the same solvents as in Example IV. After evaporation of the solvent there is obtained an oily base (26.6 g.) which is converted into a hydrochloride by dissolving it in ethanol and adding ethereal hydrogen chloride. There is thus obtained 3-chloro-10-(3-4' - N - methylacetamidopiperidinopropyl) phenthiazine hydrochloride (25.9 g.) as a creamy white crystalline powder, M.P. 210–213° C.

The initial 4-(N-methylacetamido)piperidine, M.P. 73–75° C., is obtained by catalytic debenzylation with palladium on charcoal in methanol of 1-benzyl-4-(N-methylacetamido)piperidine, M.P. 57–58° C., itself prepared by acetylation of 1-benzyl-4-monomethylamino-piperidine. 1-benzyl-4-monomethylaminopiperidine (B.P. 140–143° C./1.6 mm. Hg) is obtained from 1-benzyl-4-piperidone by reductive amination with monomethylamine in the presence of Adams' platinum.

*Example VI*

Proceeding as in Example III, but starting from 3-chloro-10-(3-4'-monomethylaminopiperidinopropyl) phenthiazine (7.75 g.) and potassium cyanate (1.98 g.), there is obtained 3-chloro-10-(3-4'-N-carbamoyl-N-methylamino-piperidinopropyl)phenthiazine (6.6 g.) which, after recrystallisation from ethyl acetate, is obtained as a white crystalline powder, M.P. 150–152° C.

The initial 3-chloro-10-(3-4'-monomethylaminopiperidinopropyl)-phenthiazine is a thick oil, prepared by deacetylation of 3-chloro-10-(3-4'-N-methylacetamidopiperidinopropyl)phenthiazine with 6 N hydrochloric acid for 7 hours under reflux, and is used in the crude form.

*Example VII*

Proceeding as in Example IV but starting from 3-chloro-10-(3-4'-monomethylaminopiperidinopropyl)phenthiazine (8 g.), methanesulphonyl chloride (2.47 g.) and pyridine (1.63 g.), there is obtained a crude base which is dissolved in benzene (160 cc.), chromatographed over alumina (80 g.) and successively eluted with benzene and with a benzene-ethyl acetate mixture (9:1).

There is obtained purified 3-chloro-10-(3-4'-methyl-methane-sulphonamidopiperidinopropyl)phenthiazine (5.3 g.) which, after recrystallisation from a benzene-cyclohexane mixture (3:5), is a white crystalline powder, M.P. 134–136° C.

*Example VIII*

A solution of 3-chloro-10-(3-4'-monomethylamino-piperidinopropyl)phenthiazine (10.8 g.) morpholinocarbonyl chloride (4.5 g.) and pyridine (2.5 g.) in chloroform (60 cc.) is heated for 2 hours under reflux.

The reaction mixture is diluted with chloroform (100 cc.), washed with water (3 x 250 cc.) and the organic phase is dried over anhydrous potassium carbonate and concentrated to dryness under reduced pressure (about 30 mm. Hg).

The oily residue is redissolved in benzene (160 cc.) and the solution is filtered through a column of chromatographic alumina (150 g.). The solution is eluted successively with benzene, with benzene-ethyl acetate mixtures of increasing ester content and finally with pure ethyl acetate. After evaporation of the solvent and recrystallisation of the solid residue from ethanol, there is obtained 3-chloro-10-(3-4'-N-morpholinocarbonyl-N-methyl - aminopiperidinopropyl)phenthiazine (5.85 g.) as a creamy-white crystalline powder, M.P. 115–117° C.

*Example IX*

A solution of 3-chloro-10-(3-4'-monomethylamino-piperidinopropyl)phenthiazine (11.5 g.), triethylamine (3 g.) and morpholinosulphonyl chloride (5.6 g.) in chloroform (100 cc.) is heated for 2 hours under reflux.

The chloroform is removed under reduced pressure (about 30 mm. Hg), the residue is treated with n-butanol (100 cc.) and the solution is washed with water (100 cc.) and potassium carbonate (2.76 g.). The organic phase is dried over potassium carbonate and concentrated to dryness under reduced pressure (about 20 mm. Hg).

The solid residue is washed by trituration in ethyl acetate and is recrystallised from n-propanol. There is thus obtained 3-chloro-10-(3-4' - N - morpholinosulphonyl-N-methyl-aminopiperidinopropyl)phenthiazine (6.3 g.) as a pale yellow crystalline powder, M.P. 137° C.

*Example X*

Proceeding as in Example III but starting with 3-methoxy-10-(3-4' - monomethylaminopiperidinopropyl)phenthiazine (12.4 g.), N hydrochloric acid (80 cc.) and potassium cyanate (3.8 g.), a crude base (14 g.) is obture (9:1) (300 cc.) and the solution is filtered through a column of chromatographic alumina (120 g.). It is then eluted successively with benzene-ethyl acetate mixtures of increasing ester content and then with pure ethyl acetate. After evaporation of the solvent, there is obtained 3-methoxy-10(3-4'-N-carbamoyl-N-methyl-aminopiperidinopropyl)phenthiazine (4.6 g.) which, after recrystallisation from acetonitrile, is obtained in the form of a white crystalline powder, M.P. 116–118° C.

3-methoxy-10-(3-4' - monomethylaminopiperidinopropyl)phenthiazine is a thick oil obtained by deacetylation of 3-methoxy-10-(3-4'-N-methylacetamidopiperidinopropyl)phenthiazine with 6 N hydrochloric acid under reflux. This latter compound is itself prepared by condensation of 3- methoxy - 10 - (3 - chloropropyl)phenthiazine with 4-(N-methylacetamido)piperidine in ethanol under reflux in the presence of sodium carbonate.

*Example XI*

Proceeding as in Example V but starting with 3-methoxy-10-(3-chloropropyl)phenthiazine (5.55 g.), 4-(N-morpholinocarbonyl-N-methylamino)piperidine (4.1 g.), sodium carbonate (in all 3.8 g.) and ethanol (150 cc.), a crude base is obtained which is dissolved in benzene (75 cc.). The solution is filtered through a column of chromatographic alumina (75 g.) and then eluted successively with the same solvents as in Example III. After evaporation of the solvent, there is obtained the purified oily base (4 g.) which is converted into an acid maleate. After recrystallisation from ethanol, there is obtained 3-methoxy-10-(3-4' - morpholinocarbonyl - N - methyl-aminopiperidinopropyl)phenthiazine acid maleate (3.66 g.) as a white crystalline powder, M.P. 174–176° C.

The initial 4-(N-morpholinocarbonyl-N-methylamino) piperidine is obtained by catalytic debenzylation with palladium over charcoal in methanol of 1-benzyl-4-(N-morpholinocarbonyl - N - methylamino)piperidine (M.P. 101–103° C.), itself prepared by condensation of morpholinocarbonyl chloride with 1-benzyl-4-monomethylaminopiperidine (B.P. 140–143° C./1.6 mm. Hg).

*Example XII*

Proceeding as in Example III but commencing with 3 - cyano - 10-(3-4' - monomethylaminopiperidinopropyl) phenthiazine (7 g.), potassium cyanate (1.75 g.) and N-hydrochloric acid (40.5 cc.), a crude base is obtained which is recrystallised from ethyl acetate to give 3-cyano-10-(3-4'-N-carbamoyl-N-methyl - aminopiperidinopropyl) phenthiazine (4.15 g.) as a yellow crystalline powder, M.P. 146–148° C.

3-cyano-10-(3-4' - monomethylaminopiperidinopropyl) phenthiazine is a thick yellow oil prepared by deacetylation of 3-cyano-10-(3-4' - N - methylacetamidopiperidinopropyl)phenthiazine with 3 N hydrochloric acid in ethanolic solution for 18 hours under reflux. This last-mentioned compound is itself obtained by the condensation of 3-cyano-10-(3-chloropropyl)phenthiazine with 4-(N-methylacetamido)piperidine in ethanol under reflux in the presence of sodium carbonate.

*Example XIII*

Proceeding as in Example III but commencing with 3-dimethylsulphamoyl - 10-(3-4'-monomethylaminopiperidinopropyl)phenthiazine (10.2 g.), potassium cyanate (7.83 g.) and N hydrochloric acid (47.5 cc.), a reaction mixture is obtained which is diluted with water (200 cc.) and made alkaline by the addition of potassium carbonate. The free base is extracted with ethyl acetate and the organic phase is dried over anhydrous potassium carbonate and concentrated to dryness under reduced pressure (about 30 mm. Hg). The residue is dissolved in benzene (150 cc.) and the solution is filtered through a column of chromatographic alumina (150 g.). It is then eluted with methanol-ethyl acetate mixtures containing 5, 10 and 50% of methanol.

After evaporation of the solvent and recrystallisation from acetonitrile there is obtained 3-dimethylsulphamoyl-10-(3-4'-N-carbamoyl-N-methyl - aminopiperidinopropyl) phenthiazine (4.5 g.) as a yellow crystalline powder, M.P. 106–112° C.

The initial 3-dimethylsulphamoyl-10-(3-4'-monomethylaminopiperidinopropyl)phenthiazine is a thick yellow oil prepared in the same manner as the corresponding 3-cyano compound.

*Example XIV*

Proceeding as in Example III but starting with 3-trifluoromethyl-10-(3 - 4' - monomethylaminopiperidinopropyl)phenthiazine (9 g.), potassium cyanate (1.95 g.) and N hydrochloric acid (45 cc.), a crude base (10 g.) is obtained which is dissolved in benzene (200 cc.). The solution is filtered through a column of chromatographic alumina (150 g.) and is eluted successively with methanol-ethyl acetate mixtures containing 5 and 10% of methyl-aminopiperidinopropyl)phenthiaze (6.5 g.) which, obtained 3-trifluoromethyl-10 - (3 - 4' - N - carbamoyl-N-methyl-aminopiperidinopropyl)penthiazine (6.5 g.) which, after recrystallisation from benzene-cyclohexane mixture (2:5), is obtained as a pale yellow crystalline powder, M.P. 137–139° C.

The initial 3-trifluoromethyl-10-(3 - 4' - monomethylaminopiperidinopropyl)phenthiazine is a thick oil prepared in a similar manner to the corresponding 3-cyano compound.

*Example XV*

3-chloro-10-(3-4' - aminoethylpiperidinopropyl)phenthiazine (38.8 g.) and formamide (25 cc.) are heated for 2½ hours at 130–140° C. After cooling, water (100 cc.) is added and the mixture is agitated with benzene (300 cc.). The organic phase is separated, washed with water, dried over anhydrous potassium carbonate and concentrated to dryness under reduced pressure (about 30 mm. Hg).

The solid residue is recrystallised from acetonitrile and there is thus obtained 3-chloro-10-(3-4'-formamidomethylpiperidinopropyl)phenthiazine (37.9 g.) as a creamy crystalline powder, M.P. 105–106° C.

The initial 3-chloro-10-(3 - 4' - aminomethylpiperidinopropyl)phenthiazine is a yellow oil (used in crude form) prepared by deacetylation of 3-chloro-10-(3-4'-acetamidomethylpiperidinopropyl)phenthiazine with 4 N hydrochloric acid for 12 hours under reflux.

*Example XVI*

A solution of methyl chloroformate (2.43 g.) in toluene (10 cc.) is run over 20 minutes into a solution of 3-chloro-10-(3-4'-aminomethylpiperidinopropyl)phenthiazine (8.3 g.) and triethylamine (2.6 g.) in toluene (80 cc.). This mixture is then agitated at ordinary temperature for 15 hours. Water (50 cc.) and 4 N hydrochloric acid (8 cc.) are then added, the aqueous phase is separated and made alkaline with sodium hydroxide (5 cc., d=1.33) and the free base is extracted with ethyl acetate (150 cc.). The organic phase is dried over potassium carbonate and concentrated to dryness under reduced pressure (about 30 mm. Hg).

The residual oil is dissolved in benzene (200 cc.), the solution is filtered through a column of chromatographic alumina (30 g.) and eluted with a benzene-ethyl acetate mixture (9:1). After evaporation of the solvent there is obtained the purified base (6.5 g.), which is converted into a hydrochloride by dissolving it in isopropanol and adding ethereal hydrogen chloride. There is thus obtained 3-chloro-10-(3-4' - methoxycarbonylaminomethylpiperidinopropyl)phenthiazine hydrochloride (5.4 g.) as a white crystalline powder, M.P. 189–190° C.

*Example XVII*

Proceeding as in Example III, but starting with 3-chloro-10-(3-4'-aminomethylpiperidinopropyl)phenthiazine (8 g.), potassium cyanate ((2.01 g.) and N hydrochloric acid (45.5 cc.), a crude base is obtained which is recrystallised from ethyl acetate to give 3-chloro-10-(3-4'-carbamoyl-aminomethylpiperidinopropyl)phenthiazine (6.5 g.) as a white crystalline powder, M.P. 136° C.

*Example XVIII*

A solution of 3-chloro-10-(3-4'-aminomethylpiperidinopropyl)phenthiazine (8.0 g.), methanesulphonyl chloride (2.36 g.) and pyridine (1.63 g.) in anyhdrous toluene (75 cc.) is heated for 2 hours under reflux. After cooling, the solution is made alkaline with sodium hydroxide (10 cc., $d=1.33$) and extracted with chloroform (200 cc.). The organic extracts are dried over potassium carbonate and concentrated to dryness under reduced pressure (about 30 mm. Hg).

The crude base thus obtained is converted into a hydrochloride by dissolving it in ethanol and adding ethereal hydrogen chloride. On recrystallisation from methanol, there is obtained 3-chloro-10-(3-4'-methanesulphonamido-methylpiperidinopropyl)phenthiazine hydrochloride (6.2 g.) as a creamy white crystalline powder, M.P. 222–225° C.

*Example XIX*

Proceeding as in Example V but starting with 3-chloro-10-(3-chloropropyl)phenthiazine (15.5 g.), 4-(N-methyl-acetamidomethyl)piperidine (8.5 g.), sodium carbonate (10.6 g.) and ethanol (90 cc.), a crude base is obtained which is converted into an acid oxalate by dissolving it in acetone and adding anhydrous oxalic acid. On recrystallisation from ethanol, there is obtained the acid oxalate of 3-chloro-10-(3-4'-N-methylacetamidomethylpiperidino-propyl)phenthiazine (14.5 g.) as a pale yellow crystalline powder, M.P. 150–155° C.

The initial 4-(N-methylacetamidomethyl)piperidine (B.P. 170–173° C./19 mm. Hg) is obtained by hydrogenation of 4-(N-methylacetamidomethyl)pyridine, as the hydrochloride, in water in the presence of Adams' platinum at ordinary pressure and temperature. This pyridine (M.P. 49–50° C.) is itself obtained by acetylation with acetic anhydride of 4-monomethylaminomethyl-pyridine (B.P. 105–106.5° C./19 mm. Hg.), which is itself prepared by reductive amination of isonicotinaldehyde with monomethylamine in ethanol in the presence of Adams' platinum.

The present invention further includes within its scope pharmaceutical compositions which comprise one or more compounds of general Formula I or their acid addition or quaternary ammonium salts together with a significant amount of a pharmaceutical carrier. The invention includes especially such compositions made up of oral, rectal, or parenteral administration.

Solid compositions for oral administration include compressed tablets, pills, dispersible powders, and granules. In such solid compositions one or more of the active compounds of general Formula I is or are admixed with at least one inert diluent such as calcium carbonate, potato starch, alginic acid, or lactose. The compositions may also comprise, as is normal practice, additional susbtances other than inert diluents, e.g., lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration, also include capsules of absorbable material such as gelatin containing one or more of the active substances of general Formula I with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oil such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manfactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired the species of animal shall be obtained. Obviously several unit dosage forms may be administered at about the same time. In general, the preparations should normally contain between 0.1 and 10 mg. per kilogram of weight of the animal to be treated. In human medicine, the preparations of the present invention should be administered so as to give, in the case of oral administration, 20 to 600 mg. of active substance per day and, in the case of parenteral administration, 10 to 500 mg. of such substance per day.

The following examples illustrate pharmaceutical compositions according to the invention.

*Example XX*

Tablets (150 mg.) are prepared containing:

| | Mg. |
|---|---|
| 3 - chloro - 10 - (3 - 4' - carbamoylaminopiperidino-propyl)phenthiazine | 25.8 |
| Starch | 91.2 |
| Finely powdered silica | 30 |
| Magnesium stearate | 3 |

These tablets may be used at the rate of 1 to 10 per day.

*Example XXI*

Tablets (150 mg.) are prepared containing:

| | Mg. |
|---|---|
| 3 - methoxy - 10 - (3 - 4' - N - carbamoyl - N-methyl-aminopiperidinopropyl)phenthiazine | 10.6 |
| Starch | 106.4 |
| Powdered silica | 30 |
| Magnesium stearate | 3 |

These tablets may be used at the rate of 1 to 20 per day.

We claim:
1. A member of the class consisting of compounds of the formula:

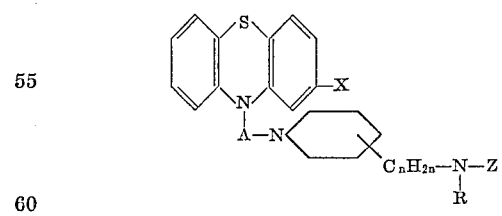

wherein X represents a member of the class consisting of halogen, lower alkoxy, cyano, dimethylsulphamoyl and trifluoromethyl, A represents a saturated aliphatic hydrocarbon group of 2 to 4 carbon atoms with at least 2 carbon atoms between the nitrogen atom of the phenthiazine nucleus and that of the piperidine nucleus, R represents a member of the class consisting of hydrogen and methyl, $n$ is a member selected from the class consisting of 0 and 1, and, when $n$ is 0, Z is a member selected from the class consisting of lower alkanesulphonyl, carbamoyl, and sulphamoyl and, when $n$ is 1, Z is a member selected from the class consisting of lower alkanoyl, lower alkoxycarbonyl, lower alkanesulphonyl, carbamoyl, and sulphamoyl, and their non-toxic acid addition salts.

2. The compound 3-chloro-10-(3-4'-acetamidomethyl-piperidinopropyl)phenthiazine.

3. The compound 3-chloro-10-(3-4'-methanesulphon-amidopiperidinopropyl)phenthiazine.

4. The compound 3-chloro-10-(3-4'-N-methylmethane-sulphonamidopiperidinopropyl)phenthiazine.

5. The compound 3-chloro-10-(3-4'-methanesulphon-amidomethylpiperidinopropyl)phenthiazine.

6. The compound 3-chloro-10-(3-4'-N-methylacet-amidomethylpiperidinopropyl)phenthiazine.

References Cited by the Examiner

UNITED STATES PATENTS

| | | | |
|---|---|---|---|
| 2,590,125 | 3/1952 | Robinson et al. | 260—243 |
| 2,830,987 | 4/1958 | Gailliot et al. | 260—243 |
| 2,894,947 | 7/1959 | Jacob et al. | 260—243 |

FOREIGN PATENTS 789,703  1/1958  Great Britain.

OTHER REFERENCES

Belgian Patent 577,922 (Rhone-Poulenc) 21 pages, published Jan. 15, 1960 [abstracted in Derwent Belgian Patents Report, vol. 61B, pages C8 to C9, Feb. 15, 1960].

Sherlock et al., 131st meeting of Am. Chem. Soc. (1957), Abstracts of Papers, pp. 18N–19N.

South African Patent 59/1343 [abstracted in Derwent Fine Chemicals Patents Journal, vol. 157, Gp 3A, page 3, October 10, 1959].

WALTER A. MODANCE, *Primary Examiner.*

IRVING MARCUS, HERBERT J. LIDOFF, *Examiners.*

UNITED STATES PATENT OFFICE
CERTIFICATE OF CORRECTION

Patent No. 3,240,779                                                March 15, 1966

Robert Michel Jacob et al.

It is hereby certified that error appears in the above numbered patent requiring correction and that the said Letters Patent should read as corrected below.

Column 2, lines 11 to 13, for

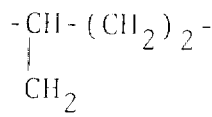      read      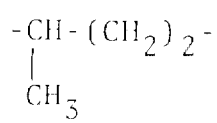

column 4, line 6, for "X" read -- Z --; column 9, line 2, strike out "tained which is dissolved in a benzene-ethyl acetate mix-" and insert the same before "ture" in line 1, same column 9; line 65, for "(7.83 g.)" read -- (1.83 g.) --; column 10, line 20, strike out "methyl-aminopiperidinopropyl)phenthiaze (6.5 g.) which," and insert instead -- methanol. After evaporation of the solvent, there is --; same column 10, line 31, for "3-4′-aminoethylpiperidinopropyl)" read -- 3-4′-amino-methylpiperidinopropyl) --.

Signed and sealed this 1st day of August 1967.

(SEAL)
Attest:

EDWARD M. FLETCHER, JR.                        EDWARD J. BRENNER
Attesting Officer                                  Commissioner of Patents